United States Patent
Takechi

(10) Patent No.: US 9,917,339 B2
(45) Date of Patent: Mar. 13, 2018

(54) NON-AQUEOUS LITHIUM-AIR BATTERY

(71) Applicant: Toyota Motor Engineering & Manufacturing North America, Inc., Erlanger, KY (US)

(72) Inventor: Kensuke Takechi, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 91 days.

(21) Appl. No.: 15/067,407

(22) Filed: Mar. 11, 2016

(65) Prior Publication Data

US 2017/0263989 A1   Sep. 14, 2017

(51) Int. Cl.
*H01M 12/08*   (2006.01)
*H01M 4/38*   (2006.01)

(52) U.S. Cl.
CPC .......... *H01M 12/08* (2013.01); *H01M 4/382* (2013.01); *H01M 2220/20* (2013.01)

(58) Field of Classification Search
CPC .... H01M 12/08; H01M 4/405; H01M 220/20; H01M 2300/0071; H01M 12/02; H01M 2300/0025; Y02T 90/32; Y02E 60/128
See application file for complete search history.

(56) References Cited

U.S. PATENT DOCUMENTS

| | | | |
|---|---|---|---|
| 8,795,868 B1 * | 8/2014 | Miles .................... | H01M 4/405 429/110 |
| 2014/0004429 A1 * | 1/2014 | Nakanishi ............. | H01M 12/08 429/403 |
| 2014/0295272 A1 * | 10/2014 | Tanaami ............. | C01F 17/0043 429/219 |
| 2016/0308220 A1 * | 10/2016 | Qi .......................... | H01M 4/90 |

* cited by examiner

*Primary Examiner* — Mark F Huff
*Assistant Examiner* — Monique Wills
(74) *Attorney, Agent, or Firm* — Oblon, McClelland, Maier & Neustadt, L.L.P.

(57) ABSTRACT

A lithium-air electrochemical cell is provided. The battery comprises: an anode compartment; a cathode compartment; and a lithium ion conductive membrane separating the anode compartment from the cathode compartment. The anode compartment comprises an anode having lithium, a lithium alloy or a porous material capable of adsorption and release of lithium and a lithium ion electrolyte, while the cathode compartment comprises an air electrode, an ionic liquid capable of supporting the reduction of oxygen and a dissolved concentration of potassium superoxide. A lithium ion concentration in the cathode compartment is low in comparison to the concentration of potassium ion.

16 Claims, 3 Drawing Sheets

NON-AQUEOUS LITHIUM-AIR BATTERY

BACKGROUND

The present embodiments are directed to a lithium-air battery having high capacity and recycle efficiency.

Lithium ion technology has dominated the market as energy source for small electronic devices and even hybrid electric vehicles. However, Li-ion batteries have insufficient theoretical capacity to be a power source for future high capacity generations of power sources capable to run an electric vehicle.

Metal-air batteries have been under investigation as an advanced generation of high capacity energy sources that have the potential to power vehicular devices for distances comparable to present hydrocarbon based combustion engines. In a metal-air battery, the metal of the anode is oxidized and the resulting cation travels to the cathode zone containing a porous matrix of a material such as carbon, for example, where oxygen is reduced and the reduction product as oxide or peroxide combines with the metal cation to form the discharge product. Upon charge, this process is ideally reversed. Metal-air batteries are recognized to have potential advantageous properties over metal ion batteries because the cathodic material, oxygen, may be obtained from the environmental air atmosphere and the capacity of the battery would in theory be limited by the anodic metal supply. Thus, oxygen gas would be supplied continuously from outside the battery and battery capacity and voltage would be dependent upon the oxygen reducing properties and chemical nature of the discharge product formed.

Lithium air batteries have the potential to supply 5-10 times greater energy density than conventional lithium ion batteries and have attracted much interest and development attention as a post lithium ion battery technology. For example, a nonaqueous lithium air battery which forms $Li_2O_2$ as discharge product theoretically would provide 3038 Wh/kg in comparison to 600 Wh/kg for a lithium ion battery having a cathodic product of $Li_{0.5}CoO_2$. However, in practice, the metal air technology and specifically current non-aqueous lithium air batteries suffer many technical problems which have prevented achievement of the theoretical capacity.

The capacity of the Li air battery is highly dependent upon the capacity of the cathode matrix to store the $Li_2O_2$ discharge product. $Li_2O_2$ is generally insoluble in conventional nonaqueous solvents employed in metal air batteries. Therefore, upon formation at the cathode matrix the $Li_2O_2$ precipitates and fills the surface porosity of the cathode matrix effectively preventing access to the vacant capacity of the matrix interior region. Moreover, $Li_2O_2$ is an insulator and once the surface of the matrix is coated, oxygen reduction is prevented and discharge terminated, i.e., the capacity of the battery is severely reduced in comparison to the theoretical capacity.

One method conventionally employed to increase the capacity of a lithium-air battery is to use an electron conducting support with high surface area such as carbon black as a cathode material. However, even though the surface area is increased, the cathode surface becomes covered by accumulation of the insulative $Li_2O_2$ product, resulting in the end of the discharge reaction. Thus, this is not the ultimate solution to improve the capacity.

In U.S. application Ser. No. 14/337,432, filed Jul. 22, 2015, the Applicants described a different solution to the problem to increase capacity by separating the battery into an anode compartment and a cathode compartment separated by a lithium ion conductive ceramic membrane and spatially arranging the air cathode at a minimum distance from the ceramic membrane to reduce lithium ion concentration at the surface of the cathode.

In spite of the significant ongoing effort described above and in the technical community, there remains a need to develop and produce an efficient, safe, cost effective, high capacity lithium air battery useful especially for powering vehicles to distances at least equal to or competitive with current hydrocarbon fuel systems.

SUMMARY OF THE EMBODIMENTS

This and other objects are addressed by the disclosure of this application, an embodiment of which includes a lithium-air battery, comprising:

an anode compartment comprising an anode comprising lithium, a lithium alloy or a porous material capable of adsorption and release of lithium;

a cathode compartment comprising an air cathode, a source of $O_2$, a lithium salt and an ionic liquid; and a lithium ion selective membrane separating the anode and cathode compartments;

wherein the cathode compartment comprises potassium superoxide dissolved in the ionic liquid.

In one aspect of this embodiment a concentration of the potassium superoxide in the ionic liquid of the cathode compartment is from 0.01 to 0.5 mol/L. In a further aspect of this embodiment a concentration of the lithium salt in the ionic liquid of the cathode compartment is 10 mmol/L or less. Further, the cathode compartment may be spacially arranged such that a distance of the air cathode from the lithium ion selective membrane is at least 0.1 mm and the lithium ion concentration may be in the form of a gradient such that a lithium ion concentration at the lithium ion selective membrane is greater than a lithium ion concentration at the air cathode.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS

Figure 1:
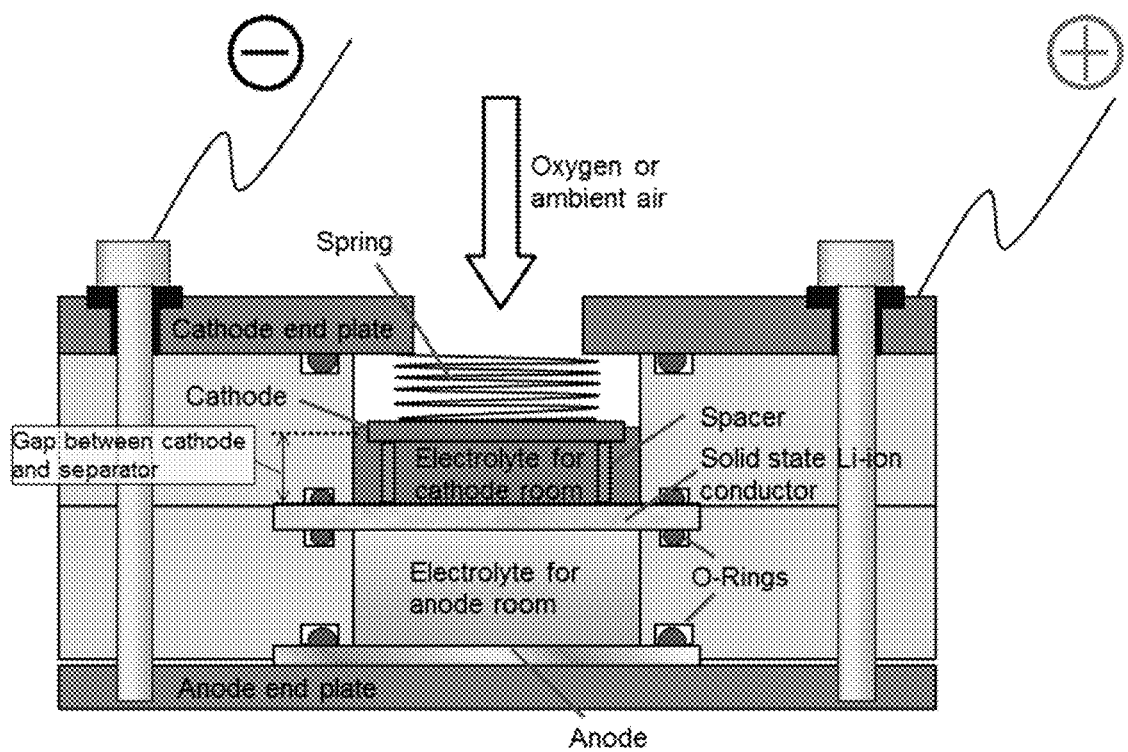
FIG. 1 shows a schematic diagram of a lithium air battery according to one embodiment of the present invention.

Throughout this description all ranges described include all values and sub-ranges therein, unless otherwise specified. Additionally, the indefinite article "a" or "an" carries the meaning of "one or more" throughout the description, unless otherwise specified. Where a numerical limit or range is stated, the endpoints are included. Also, all values and subranges within a numerical limit or range are specifically included as if explicitly written out. The phrases "selected from the group consisting of," "chosen from," and the like include mixtures of the specified materials. Terms such as "contain(s)" and the like are open terms meaning 'including at least' unless otherwise specifically noted.

Throughout this description, the terms air, oxygen and $O_2$ as cathode material may be used interchangeably unless specifically limited. One of ordinary skill will understand that $O_2$ is the redox active cathode ingredient and whether described as air, oxygen or $O_2$, the meaning is understood. In certain description air or pure $O_2$ may be described as the source of the cathode ingredient and the meaning of the statement will be clearly understood from the gist of the disclosure.

Further, in the following description the compartments of the electrochemical cell formed by the lithium ion selective membrane, also referred to as the solid state Li-ion conductor may be described as "rooms," i.e., cathode room for cathode compartment or anode room for anode compartment.

The terms electrochemical cell and battery may in some instances be employed interchangeably. However, it may also be possible to construct a battery with a plurality of electrochemical cells. The meaning of these terms will be understood within the context of the description which follows.

According to the present invention the term "vehicle" means any power driven device designed for transportation including an automobile, truck van, bus, golf cart and other utility forms of transportation.

The present inventors are conducting a broad and detailed study of post-lithium ion battery technologies seeking to identify and develop new and improved energy supply systems having capacity and voltage suited to specific uses. Metal-gas batteries having high capacity and high working potential are targets of such study and in this ongoing study the inventors have discovered a new and novel lithium air battery which addresses and overcomes many of the problems associated with conventionally known lithium air batteries as described above.

Therefore, an embodiment a lithium-air battery is provided which comprises an anode compartment comprising an anode comprising lithium, a lithium alloy or a porous material capable of adsorption and release of lithium; a cathode compartment comprising an air cathode, a source of $O_2$, a lithium salt and an ionic liquid; and a lithium ion selective membrane separating the anode and cathode compartments; wherein the cathode compartment comprises potassium superoxide dissolved in the ionic liquid. The inventors have surprisingly discovered that when potassium superoxide is available as a component of an ionic liquid in the cathode compartment, significant advantages and improvement in performance of the battery are obtained.

Figure 3:
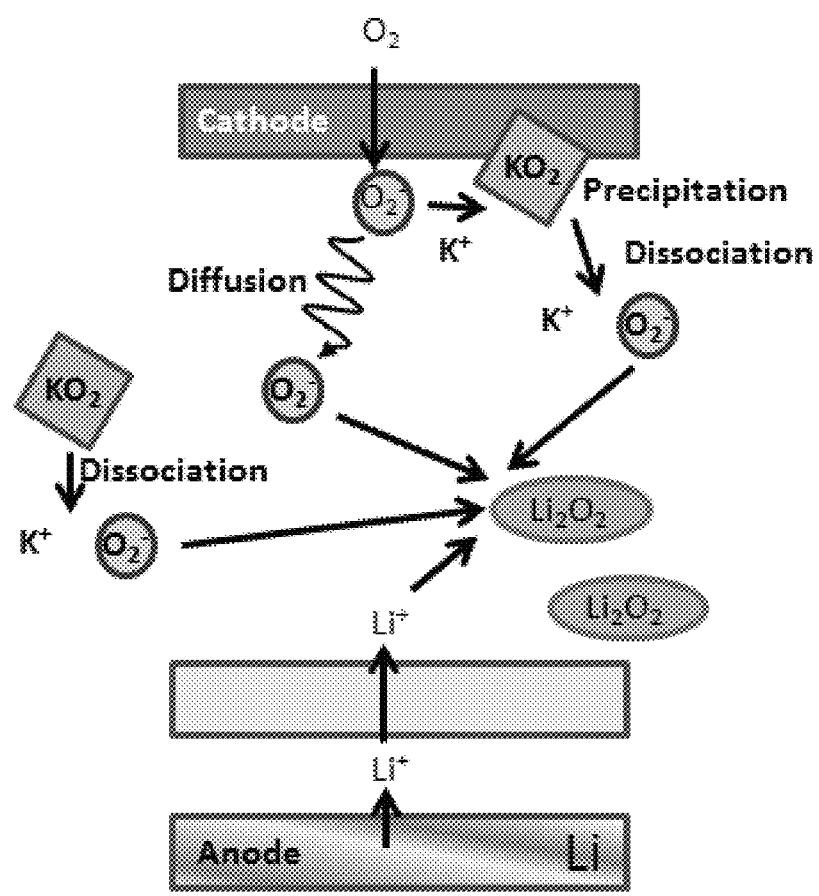
FIG. 3 shows a schematic description of the basic functional structure of a lithium-air battery according to the embodiment described.

A schematic diagram of the structure and function of the elements of the embodiment is shown in FIG. 3. The separated cell structure obtained by placement of the ion selective membrane between the cathode and the anode prevents direct reaction between lithium ions and reduced $O_2$ radicals on cathode, because the electrolyte at the cathode will have very low or no lithium ion concentration. At the same time a working concentration of lithium ions is maintained near the anode. The ion selective membrane as a solid state conductor also protects the moisture sensitive anode from water or carbon dioxide which may enter the battery at the cathode and thus allows capability to employ ambient air as the cathode active material.

During discharge of the lithium air battery lithium is oxidized at the anode to form lithium ions in the anode compartment. These ions travel to the lithium ion selective membrane, transport across the membrane and enter the cathode compartment. Simultaneously, at the air cathode, oxygen is reduced at the cathode to form anion reduction products including peroxide ions and oxide ions. According to the present embodiments the concentration of potassium ions present at the cathode environment is greater than the concentration of lithium ions which have traversed the membrane.

Thus direct reaction between $Li^+$ and reduced $O_2$ radicals at the cathode may be minimized or actually eliminated because the electrolyte nearby the cathode is expected to have little or no lithium ion concentration. Further, to promote the $O_2$ reduction reaction, the electrolyte should contain $KO_2$. The $KO_2$ may be at least partially dissolved in the electrolyte and present as dissociated $K^+$ and $O_2^-$ ions. Oxygen anions formed by electrochemical reduction of $O_2$ on the cathode will be released into the electrolyte where reaction with $K^+$ as the predominant cation specie in the electrolyte produces $KO_2$ crystal on cathode. Reaction of the oxygen anions with $Li^+$ which were transported across the solid state electrolyte takes place in the electrolyte away from the cathode and thus forms $Li_2O_2$ in the electrolyte. Thus, according to this model predominantly, only $KO_2$ is stored or retained within the cathode and because $KO_2$ readily forms form large crystals which do not coat or clog the cathode surface, a high capacity battery may be obtained.

The system described above is reversible and thus provides a secondary battery. Regarding rechargeability, the use of the K-ion in cathode side increases the efficiency of the electrochemical decomposing capability, which gives higher cycleability of the battery. Regarding rate capability and capacity, use of the K-ion in cathode compartment increases the electrochemical active site of the cathode to give higher current density and larger discharge product growth, which results in higher capacity.

A structural diagram of a lithium-air battery according to an aspect of the above embodiment is shown in FIG. 1 wherein spacers are placed between the air cathode and the solid state lithium ion selective membrane (solid state Li-ion conductor) to impart and maintain a set distance gap between the cathode and the lithium ion selective membrane.

The cathode compartment comprises an ionic liquid, preferably an ionic liquid having a high tolerance of and stability to a radical formed by reduction of $O_2$. The ionic liquids suitable may comprise any of cations such as imidazolium cation, piperidinium cation, pyrrolidinium cation and ammonium cation and any of anions such as bis(trifluoromethansulfonyl)imide anion, bis(fluorosulfonyl)imide anion, tetrafluoroborate anion and hexafluorophosphate anion. In preferred embodiments the ionic liquid may be N-methyl-N-propylpiperidinium bis(trifluoromethansulfonyl)imide (PP13TFSI) or N,N-diethyl-N-methyl-N-(2-methoxyethyl)ammonium bis(trifluoromethylsulfonyl)imide (DEME-TFSA). Moreover, the ionic liquid is selected on a basis that the ionic liquid is capable to reduce $O_2$ electrochemically on the cathode without requirement for the presence of a lithium salt. In one useful embodiment of the present invention, the cation portion of the ionic liquid may be tetrabutyammonium (TBA).

Potassium superoxide is a yellow solid that decomposes in moist air and is a super oxidizer. Accordingly, it must be handled in a controlled atmosphere. It is available commercially in various grades.

Due to the poor solubility of $KO_2$ in ionic liquids, too high a content of $KO_2$ in the cathode compartment may result in reduced $O_2$ reduction capability. Thus, the concentration of $KO_2$ should be in a range of 0.01-0.5 mol/L, and more preferably, 0.01-0.2 mol/L. The actual optimum performing concentration will depend upon the ionic liquid employed and other components of the catholyte.

Additionally, in consideration of the above explanation of the system based on FIG. 3, the $Li^+$ of the catholyte may be minimized to prevent unnecessary cathode reaction (clogging). Therefore, the concentration of $Li^+$(Li salts) should be in a range of 0-10 mmol/L, and more preferably, 0-1 mmol/L.

Further, a salt that further enhances the performance of the ionic liquid may be added to the cathode compartment. Such salt must be soluble in the ionic liquid and may serve to stabilize reduced $O_2$ radicals obtained at the cathode without forming solid precipitates which would congest the cathode matrix. Suitable salts that may be added to the cathode compartment include salts of organic cations compatible with an ionic liquid. Examples of such salts include tetraalkyl ammonium salts, imidazolium salts, pyridinium salts and piperidinium salts. In one embodiment, an additive salt may be tetrabutyl ammonium (TBA) bis(trifluoromethylsulfonyl) amide (TFSA).

Upon construction of the cell an ionic liquid that is free of lithium salt may be placed in the cathode department. During a discharge operation of the cell, lithium ions formed by an oxidative reaction at the anode may pass through the lithium ion selective membrane and enter the cathode compartment. At the same time $O_2$ is reduced to peroxide ion at the cathode and the peroxide ion must migrate from the cathode working surface into the cathode compartment to encounter lithium ions entering the compartment through the selective ion membrane.

In this manner, a concentration gradient of lithium ions is formed such that the concentration is highest near the selective ion membrane and least near the air cathode. Correspondingly, the greatest amount of lithium peroxide ($Li_2O_2$) is formed in the gap away from the cathode surface and does not precipitate onto and cover the surface of the cathode. As the cathode surface remains exposed and not insulated, the oxygen reduction reaction (ORR) may continue. This effect is significantly enhanced by the presence of dissociated $K^+$ and $O_2^-$ near the cathode surface as diagrammed in FIG. 3.

The gap between the selective membrane and the cathode may be sized according to the performance and end-use requirements for the battery. In theory, any gap present would result in the concentration gradient according to the invention. Thus a gap distance between the cathode and selective ion membrane of as little as 0.1 mm may be employed. One of ordinary skill will understand that the greater the gap distance, the greater the opportunity to form a concentration gradient of the discharge products as described. Thus a battery having a gap of 3 mm or more, preferably at least 5 mm may be constructed. Although, in theory, the gap may be as large as 100 mm, size and performance constraints may place a practical upper limit of 20 mm, preferably 15 mm and most preferably 10 mm.

Also, the electrolyte system of the present invention allows for exposure of the cathode to air as an oxygen source because the ionic liquid is not volatile and therefore electrolyte loss during the battery operation is not a problem.

The purpose of the lithium ion conductive membrane is to allow reversible passage of lithium ions (Li+) from the anode compartment to the cathode compartment. The membrane may be constructed of a polymer, a ceramic or a composite thereof. To reduce any detrimental effect of gas on performance of the anode, an effective membrane will be fully impermeable or substantially impermeable to gas, thus preventing gas admitted to the cathode compartment from entrance to the anode compartment. The partition may be a lithium-ion conducting ceramics plate such as Li—La—Ti—O based perovskite, a Li—Al—Ti—P—O based NASICON, a Li—La—Zr—O based garnet, a Li—P—S based solid electrolyte and a Li—Ge—P—S based solid electrolyte.

The use of solid state conductor also gives a capability of the introduction of the ambient air because it prevents moisture and carbon dioxide coming from the air from approaching the anode to deactivate it.

The metal of the anode may comprise any of lithium, a lithium alloy or a material capable of intercalation of lithium, such as, for example a porous carbon or silicon.

The positive electrode may be of a porous unit construction and may further comprise an oxidation reduction catalyst, a conductive material and a binder. The cathode may be constructed by mixing the redox catalyst, conductive material and optionally the binder and applying the mixture to a current collector of appropriate shape. The oxidation reduction catalyst may be any material which promotes the $O_2$ redox reaction.

Examples of an $O_2$ redox catalyst may include but are not limited to an alkali or alkali earth metal in the form of its oxide ($Li_2O$, $Na_2O$, $K_2O$, MgO, CaO, SrO, BaO), hydroxide (LiOH, NaOH, KOH, $Mg(OH)_2$, $Ca(OH)_2$, $Sr(OH)_2$, $Ba(OH)_2$), carbonate ($Li_2CO_3$, $Na_2CO_3$, $K_2CO_3$, $MgCO_3$, $CaCO_3$, $SrCO_3$, $BaCO_3$), or any combination thereof. The active component is typically impregnated on a high surface area oxide support such as $Al_2O_3$, $ZrO_2$, $TiO_2$, $CeO_2$, or any mixed oxide thereof. A precious metal such as Pt, Pd, Rh, or any combination thereof may be present in the catalyst. The positive electrode may contain an electrically-conductive material which is chemically stable in the potential window of use of the cell.

Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. In order to assist diffusion of the air, it may be preferable that the collector is a porous body, such as mesh. In certain embodiments the charge collector may comprise a protective coating of an oxidation-resistant metal or alloy to protect the collector from oxidation.

Due to the presence of the lithium conducting membrane the battery is divided into an anode compartment and a cathode compartment. The lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

Herein the system of the anode compartment may be referenced as the anolyte while the system of the cathode compartment may be referenced as the catholyte. Nonaqueous solvents suitable for the anode compartment include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethylene glycol dimethyl ether. In some preferred embodiments the solvent may be a nitrile system solvent such as acetonitrile or an ionic liquid.

An example of a lithium-air battery according to the present invention is schematically shown in FIG. 1. In FIG. 1 the lithium ion selective membrane is labeled as solid state Li-ion conductor and the cathode room contains the ionic liquid and the cathode while the anode compartment contains the electrolyte and the lithium anode. The cell is housed in a container which is charged with oxygen or ambient air. The gas enters the cathode compartment through the opening of the cathode end plate.

Further, the present invention also includes a vehicle that contains a lithium-air electrochemical cell as described above or a battery constructed of a plurality of the lithium-air electrochemical cells.

Having generally described the above embodiments, a further understanding can be obtained by reference to certain specific examples which are provided herein for purposes of illustration only and are not intended to be limiting unless otherwise specified.

EXAMPLES

Lithium-air batteries were constructed according to the structure schematically shown in FIG. 1 according to each system described below.

Basic (Common) Setup and Condition for Example and Comparative Example Experiments Solid state Li-ion conductor (separator): 1 mm of thickness of solid state Li-ion conductor, LIC-GC (OHARA glass)

The gap between cathode and solid state Li-ion conductor: 5 mm

Electrolyte for anode compartment: 1.0 mol/L LiTFSA[*1] (Kishida chamical) in propylene carbonate (Kishida chemical)

Anode: 0.25 mm of thickness of Li metal (FMC corp.)
Evaluation temp.: 25° C.
Introduced gas: Pure oxygen (1.2 atm, closed condition)

Example 1

Electrolyte for cathode compartment: 0.1M $KO_2$ in N,N-diethyl-N-methyl-N-(2-methoxyethyl)ammonium bis(trifluoromethylsulfonyl)imide (DEME-TF SA) (Kanto corp.)
Cathode: Carbon paper (TGP-H-120, thickness=0.36 mm, Toray Industry)

Example 2

Electrolyte for cathode compartment: 0.1M $KO_2$ in DEME-TFSA
Cathode: Carbon paper (TGP-H-30, thickness=0.11 mm, Toray Industry)

Comparative Example 1

Electrolyte for cathode compartment: DEME-TFSA (no-salt added)
Cathode: Carbon paper (TGP-H-120, thickness=0.36 mm, Toray Industry)

Comparative Example 2

Electrolyte for cathode room: DEME-TFSA (no-salt added)
Cathode: Carbon paper (TGP-H-30, thickness=0.11 mm, Toray Industry)

Comparative Example 3

Electrolyte for cathode room: 0.352M LiTFSI in DEME-TFSA
Cathode: Carbon paper (TGP-H-120, thickness=0.36 mm, Toray Industry)

Figure 2:
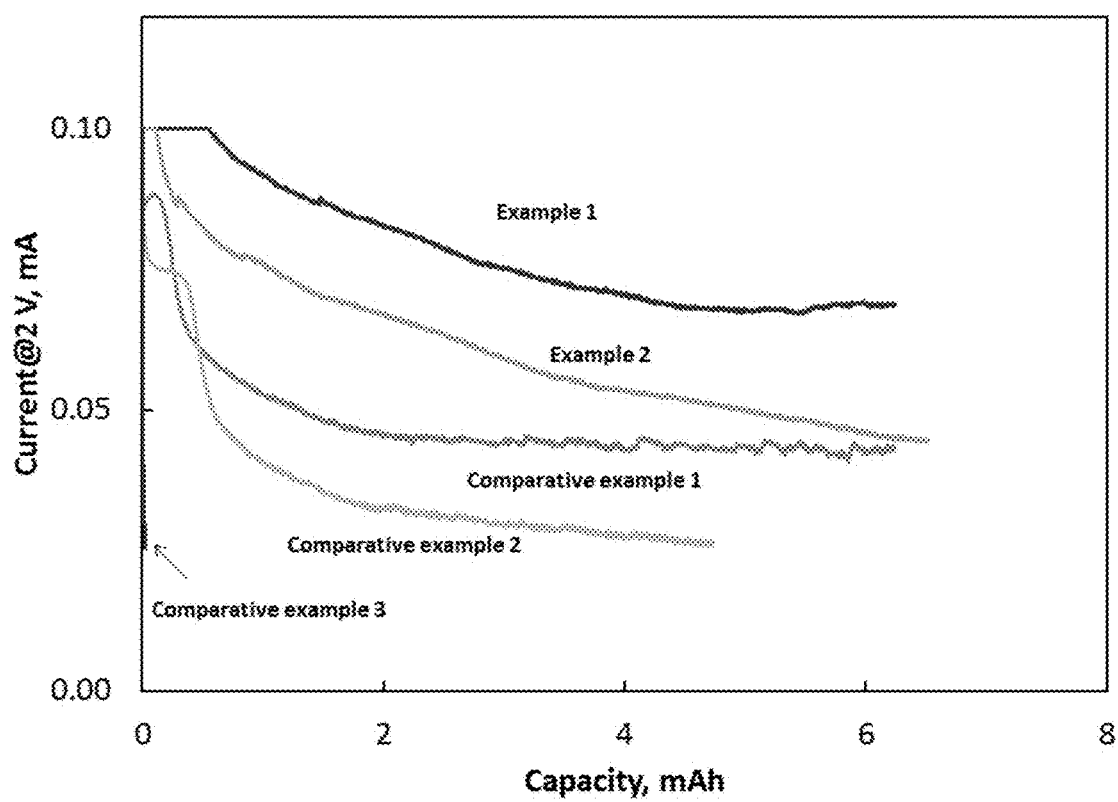
FIG. 2 shows the Discharge curves of Example 1, Example 2 and Comparative examples 1, 2 and 3.

The Discharge curves obtained for Example 1, Example 2 and Comparative examples 1, 2 and 3 are shown in FIG. 2. The discharge was run at constant current and constant voltage (CC-CV) mode with 100 mA up to the offset potential of 2.0 V vs. Li and the cut-off current of 5 mA. FIG. 2 shows that Example 1 and Example 2 had significantly larger capacity and rate capability than Comparative examples 1, 2 and 3.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A lithium-air battery, comprising:
an anode compartment comprising an anode comprising lithium, a lithium alloy or a porous material capable of adsorption and release of lithium;
a cathode compartment comprising an air cathode, a source of $O_2$, a lithium salt and an ionic liquid; and
a lithium ion selective membrane separating the anode and cathode compartments;
wherein the ionic liquid is selected from the group consisting of an imidazolium cation, a piperidinium cation, a pyrrolidinium cation and an ammonium cation associated with an anion selected from the group consisting of a bis(trifluoromethansulfonyl)imide anion, a bis (fluorosulfonyl)imide anion, a tetrafluoroborate anion and a hexafluorophosphate anion, and the cathode compartment comprises potassium superoxide dissolved in the ionic liquid.

2. The lithium-air battery of claim 1 wherein a concentration of the potassium superoxide in the ionic liquid is from 0.01 to 0.5 mol/L.

3. The lithium-air battery of claim 1 wherein a concentration of the lithium salt in the ionic liquid is 10 mmol/L or less.

4. The lithium-air battery of claim 1 wherein the cathode compartment is spacially arranged such that a distance of the air cathode from the lithium ion selective membrane is at least 0.1 mm.

5. The lithium-air battery of claim 3, wherein the lithium ion concentration is in the form of a gradient such that a lithium ion concentration at the lithium ion selective membrane is greater than a lithium ion concentration at the air cathode.

6. The lithium-air battery of claim 1, wherein the distance of the cathode from the lithium ion selective membrane is from 0.1 to 20 mm.

7. The lithium-air battery of claim 1, wherein the distance of the cathode from the lithium ion selective membrane is from 3 to 20 mm.

8. The lithium air battery of claim 1, wherein the lithium ion conductive membrane separating the anode compartment from the cathode compartment is a polymer, a ceramic or a composite thereof.

9. The lithium air battery of claim 6, wherein the membrane comprises a ceramic material.

10. The lithium air battery of claim 9, wherein the ceramic membrane comprises one selected from the group consisting of a Li—La—Ti—O based perovskite, a Li—Al—Ti—P—O based NASICON, a Li—La—Zr—O based garnet, a Li—P—S based solid electrolyte and a Li—Ge—P—S based solid electrolyte.

11. The lithium air battery of claim 1, wherein the ionic liquid is N,N-diethyl-N-methyl-N-(2-methoxyethyl)ammonium cation (DEME)-bis(trinuoromethylsulfonyl)imide anion.

12. The lithium-air battery of claim 1, wherein the cathode compartment further comprises a salt soluble in the ionic liquid which is different from the lithium salt and the potassium superoxide.

13. The lithium-air battery of claim 12, wherein the further comprised ionic liquid soluble salt is selected from the group consisting of a tetraalkyl ammonium salt, an imidazoliwn salt, a pyridinium salt and a piperidinium salt.

14. The lithium-air battery of claim 13, wherein the ionic liquid soluble salt is tetrabutyl ammonium bis(trifluoromethylsulfonyl)imide.

15. The lithium-air battery of claim 1, wherein the source of $O_2$ is air.

16. A vehicle comprising the battery of claim 15.

* * * * *